(12) United States Patent
Ma (10) Patent No.: US 11,617,219 B2
(45) Date of Patent: Mar. 28, 2023

(54) BEARER CONFIGURATION METHOD FOR RRC CONNECTION REESTABLISHMENT, TERMINAL, AND NETWORK DEVICE

(71) Applicant: VIVO MOBILE COMMUNICATION CO., LTD., Guangdong (CN)

(72) Inventor: Yue Ma, Chang'an Dongguan (CN)

(73) Assignee: VIVO MOBILE COMMUNICATION CO., LTD., Chang'an Dongguan (CN)

( * ) Notice: Subject to any disclaimer, the term of this patent is extended or adjusted under 35 U.S.C. 154(b) by 162 days.

(21) Appl. No.: 17/094,678

(22) Filed: Nov. 10, 2020

(65) Prior Publication Data

US 2021/0059000 A1 Feb. 25, 2021

Related U.S. Application Data

(63) Continuation of application No. PCT/CN2019/085129, filed on Apr. 30, 2019.

(30) Foreign Application Priority Data

May 10, 2018 (CN) .......................... 201810445326.3

(51) Int. Cl.
*H04W 76/19* (2018.01)
*H04W 76/11* (2018.01)
(Continued)

(52) U.S. Cl.
CPC ....... *H04W 76/19* (2018.02); *H04W 28/0268* (2013.01); *H04W 76/11* (2018.02);
(Continued)

(58) Field of Classification Search
CPC . H04W 76/19; H04W 28/0268; H04W 76/11; H04W 76/27; H04W 80/02;
(Continued)

(56) References Cited

U.S. PATENT DOCUMENTS

2017/0070896 A1 3/2017 Shindo
2017/0171903 A1* 6/2017 Kubota ............... H04W 36/165
(Continued)

FOREIGN PATENT DOCUMENTS

CN 102104982 A 6/2011
CN 106105293 A 11/2016
(Continued)

OTHER PUBLICATIONS

CN Office Action in Application No. 201810445326.3 dated Oct. 21, 2020.
(Continued)

*Primary Examiner* — Will W Lin
(74) *Attorney, Agent, or Firm* — Maschoff Brennan (57) ABSTRACT

This disclosure provides a bearer configuration method for RRC connection reestablishment, a terminal, and a network device. The method in this disclosure includes: when receiving an RRC reestablishment complete message sent by a terminal, determining a Packet Data Convergence Protocol PDCP type supported by a target network to be accessed by the terminal, where the PDCP type includes type-1 PDCP supporting a first network or type-2 PDCP supporting a second network; and reconfiguring bearers in a subsequent RRC process based on the determined PDCP type.

19 Claims, 5 Drawing Sheets

(51) Int. Cl.
*H04W 76/27* (2018.01)
*H04W 28/02* (2009.01)
*H04W 80/02* (2009.01)
*H04W 84/04* (2009.01)

(52) U.S. Cl.
CPC ........... *H04W 76/27* (2018.02); *H04W 80/02* (2013.01); *H04W 84/042* (2013.01)

(58) Field of Classification Search
CPC ............... H04W 84/042; H04W 76/16; H04W 28/0263; H04W 76/18
See application file for complete search history.

(56) References Cited

U.S. PATENT DOCUMENTS

| | | | |
|---|---|---|---|
| 2018/0063014 A1 | 3/2018 | Yu et al. | |
| 2018/0139745 A1 | 5/2018 | Xiao et al. | |
| 2019/0174576 A1* | 6/2019 | Palat | H04W 76/10 |
| 2019/0268818 A1* | 8/2019 | Yi | H04W 80/08 |
| 2020/0077317 A1* | 3/2020 | Sharma | H04W 28/24 |
| 2020/0113008 A1* | 4/2020 | Luo | H04W 76/12 |
| 2020/0245393 A1* | 7/2020 | Teyeb | H04W 76/25 |
| 2020/0288528 A1* | 9/2020 | Lei | H04W 76/27 |
| 2021/0022198 A1* | 1/2021 | Wang | H04W 36/0079 |

FOREIGN PATENT DOCUMENTS

| | | |
|---|---|---|
| CN | 106162808 A | 11/2016 |
| CN | 106304399 A | 1/2017 |
| WO | 2018/029513 A1 | 2/2018 |
| WO | 2018/030798 A1 | 2/2018 |

OTHER PUBLICATIONS

"Precenitng Legacy LTE UEs from camping on eLTE Cells & PLMNs connected to New 5G Core Network only" Qualcomm Incorporated, 3GPP TSG-RAN2 Meeting #99, R2-1707786, Aug. 21, 2017.
"NR PDCP for SRB for a UE accessing 5GC via ng-eNB" Huawei, HiSilicon, 3GPP TSG-RAN WG2 Meeting #99bis, R2-1711110, Oct. 9, 2017.
Written Opinion and International Search Report in Application No. PCT/CN2019/085129 dated Nov. 19, 2020.
Ericsson, "Bearer type change," 3GPP TSG-RAN WG2 #99, R2-1708094, pp. 1-6, (Aug. 21, 2017).
Samsung, "PDCP operations during PDCP version change in EN-DC," 3GPP TSG-RAN WG2 2017 RAN2#99bis Meeting, R2-1711146, pp. 1-12, (Oct. 9, 2017).
Ericsson, "OFFLINE#22 LTE re-establishment and resume while using NR PDCP," 3GPP TSG-RAN WG2 Meeting #100, R2-1714208, pp. 1-12, (Nov. 27, 2017).
Ericsson et al., "Remaining issues in Resume and Reestablishment in EN-DC (TP to 36.331)," 3GPP TSG-RAN WG2 #101, R2-1804069, pp. 1-7, (Feb. 26, 2018).
Extended European Search Report dated Jun. 9, 2021 as received in Application No. 19800587.8.

\* cited by examiner

BEARER CONFIGURATION METHOD FOR RRC CONNECTION REESTABLISHMENT, TERMINAL, AND NETWORK DEVICE

CROSS-REFERENCE TO RELATED APPLICATIONS

The present application is a continuation of PCT Application No. PCT/CN2019/085129 filed on Apr. 30, 2019, which claims a priority of the Chinese patent application No. 201810445326.3 filed in China on May 10, 2018, which is incorporated herein by reference in its entirety.

TECHNICAL FIELD

This disclosure relates to the technical field of communication applications, and in particular, to a bearer configuration method for RRC connection reestablishment, a terminal, and a network device.

BACKGROUND

The 3rd Generation Partnership Project (3rd Generation Partnership Project, 3GPP) radio access network RAN mainly defines two evolution directions for a 5G system: eLTE and 5G new radio NR. eLTE refers to a 5G core network (NGC, from R15) accessed via an LTE air interface. The eLTE project is successfully initiated at the RAN #75 meeting (RP-170840), and is discussed at the RAN2 #98 meeting.

There are a plurality of possibilities of LTE deployment. For example, an LTE base station is connected to both an EPC (4G core network) and an NGC (5G core network); or the LTE base station is connected only to a 5GC or an LTE base station is connected only to an EPC.

An RRC reestablishment process includes the following steps:

(1) A terminal sends an RRC (Radio Resource Control, radio resource control) connection reestablishment request to an evolved universal terrestrial radio access network EUTRAN.

(2) The terminal receives an RRC connection reestablishment message sent by the EUTRAN.

(3) The terminal sends an RRC connection reestablishment complete message to the EUTRAN.

Reestablishment is an operation performed when the UE needs to access a network again because a failure occurs in a current cell or a handover failure occurs.

In an EN-DC (LTE and NR dual connectivity) access process, by default, signaling radio bearers (SRB1/2) first use the LTE Packet Data Convergence Protocol (Packet Data Convergence Protocol, PDCP), and then after an msg5 is transmitted, the network and the UE automatically implicitly switch to use NR PDCP. Subsequently, before a security activation command is transmitted, the SRB2 is reconfigured to use NR PDCP.

In the RRC reestablishment process in eLTE, which PDCP type should be used by the SRB1 and when the PDCP type should be switched are not discussed or specified. In addition, how a network side determines an ECGI reported during reestablishment if a cell simultaneously supports two core networks is not defined either.

SUMMARY

According to a first aspect, an embodiment of this disclosure provides a bearer configuration method for RRC connection reestablishment, where the method is applied to a network device, and includes:

when receiving an RRC reestablishment complete message sent by a terminal, determining a Packet Data Convergence Protocol (PDCP) type supported by a target network to be accessed by the terminal, where the PDCP type includes type-1 PDCP supporting a first network or type-2 PDCP supporting a second network; and reconfiguring bearers in a subsequent RRC process based on the determined PDCP type.

According to a second aspect, an embodiment of this disclosure further provides a bearer configuration method for radio resource control (RRC) connection reestablishment, where the method is applied to a terminal, and includes:

determining a PDCP type for performing PDCP configuration for an SRB1 (signaling radio bearer (SRB)1) for sending an RRC reestablishment complete message, where the PDCP type includes type-1 PDCP supporting a first network or type-2 PDCP supporting a second network; and sending the RRC reestablishment complete message to a network device based on the PDCP type for performing the PDCP configuration.

According to a third aspect, an embodiment of this disclosure further provides a network device, including:

a first receiving module, configured to: when receiving an RRC reestablishment complete message sent by a terminal, determine a PDCP type supported by a target network to be accessed by the terminal, where the PDCP type includes type-1 PDCP supporting a first network or type-2 PDCP supporting a second network; and a reconfiguration module, configured to reconfigure bearers in a subsequent RRC process based on the determined PDCP type.

According to a fourth aspect, an embodiment of this disclosure further provides a network device, including a memory, a processor, and a computer program stored in the memory and capable of running on the processor, where when the computer program is executed by the processor, steps of the foregoing bearer configuration method for RRC connection reestablishment are implemented.

According to a fifth aspect, an embodiment of this disclosure further provides a terminal, including:

a determining module, configured to determine a PDCP type for performing PDCP configuration for an SRB1 when an RRC reestablishment complete message is sent, where the PDCP type includes type-1 PDCP supporting a first network or type-2 PDCP supporting a second network; and a first sending module, configured to send the RRC reestablishment complete message to a network device based on the PDCP type for performing the PDCP configuration.

According to a sixth aspect, an embodiment of this disclosure further provides a terminal, including a memory, a processor, and a computer program stored in the memory and capable of running on the processor, where when the computer program is executed by the processor, steps of the foregoing bearer configuration method for RRC connection reestablishment are implemented.

According to a seventh aspect, an embodiment of this disclosure further provides a computer-readable storage medium, where the computer-readable storage medium stores a computer program, and when the computer program is executed by a processor, steps of the foregoing bearer configuration method for RRC connection reestablishment are implemented.

BRIEF DESCRIPTION OF DRAWINGS

To describe the technical solutions in the embodiments of this disclosure more clearly, the following briefly describes the accompanying drawings required for describing the embodiments of this disclosure. Apparently, the accompanying drawings in the following description show merely some embodiments of this disclosure, and persons of ordinary skill in the art may still derive other drawings from these accompanying drawings without creative efforts.

DESCRIPTION OF EMBODIMENTS

The following describes exemplary embodiments of this disclosure in more detail with reference to the accompanying drawings. Although the exemplary embodiments of this disclosure are shown in the accompanying drawings, it should be understood that this disclosure may be implemented in various forms and should not be limited by the embodiments set forth herein. On the contrary, the embodiments are provided to enable a more thorough understanding of this disclosure and completely convey the scope of this disclosure to a person skilled in the art.

The terms "first", "second", and the like in this specification and claims of this application are used to distinguish between similar objects instead of describing a specific order or sequence. It should be understood that the data used in this way is interchangeable in appropriate circumstances so that the embodiments of this application described herein can be implemented in other orders than the order illustrated or described herein. In addition, the terms "include", "have", and any other variant thereof are intended to cover a non-exclusive inclusion. For example, a process, method, system, product, or device that includes a list of steps or units is not necessarily limited to those steps or units that are expressly listed, but may include other steps or units that are not expressly listed or are inherent to the process, method, system, product, or device. The term "and/or" used in this specification and claims indicates at least one of connected objects.

Examples provided in the following description are not intended to limit the scope, applicability, or configuration described in the claims. Functions and arrangements of discussed elements may be changed without departing from the spirit and scope of this disclosure. Various examples may be omitted or replaced properly, or various procedures or components may be added. For example, the described method may be performed in an order different from the described order, and steps may be added, omitted, or combined. In addition, features described with reference to some examples may be combined in other examples.

Figure 1:
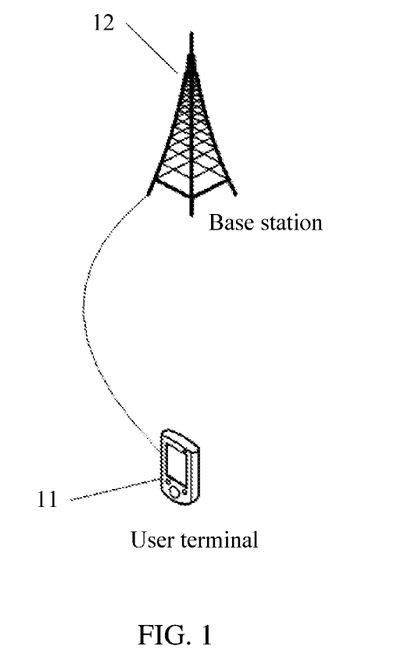
FIG. 1 is a structural diagram of a network system to which an embodiment of this disclosure may be applied.

FIG. 1 is a structural diagram of a network system to which an embodiment of this disclosure may be applied. As shown in FIG. 1, the network system includes a user terminal 11 and a base station 12. The user terminal 11 may be user equipment (User Equipment, UE), for example, may be a terminal device such as a mobile phone, a tablet computer (Tablet Personal Computer), a laptop computer (Laptop Computer), a personal digital assistant (personal digital assistant, PDA), a mobile Internet device (Mobile Internet Device, MID), or a wearable device (Wearable Device). It should be noted that a specific type of the user terminal 11 is not limited in the embodiments of this disclosure. The base station 12 may be a base station (for example, a gNB or a 5G NR NB) in 5G or a later version, or a base station in another communications system, or is referred to as a NodeB, an evolved NodeB, a transmission and reception point (TRP), or another term in the field. As long as a same technical effect is achieved, the base station is not limited to a specific technical term. It should be noted that only a 5G base station is used as an example in the embodiments of this disclosure, but a specific type of the base station 12 is not limited.

Figure 2:
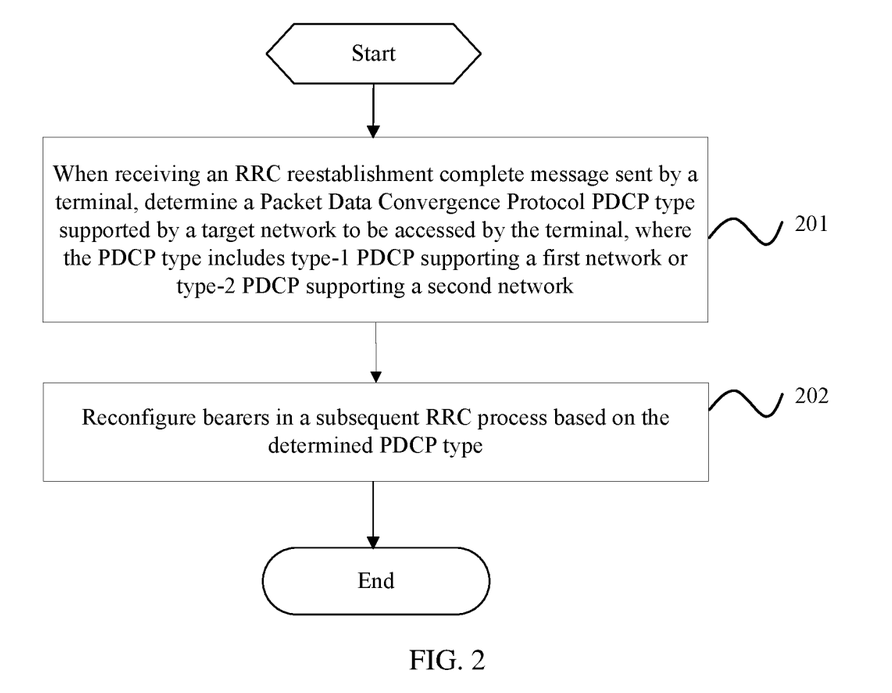
FIG. 2 is a first schematic flowchart of a bearer configuration method for RRC connection reestablishment according to an embodiment of this disclosure.

FIG. 2 is a schematic flowchart of a bearer configuration method for radio resource control (RRC) connection reestablishment according to an embodiment of this disclosure. As shown in FIG. 2, an embodiment of this disclosure provides a bearer configuration method for RRC connection reestablishment. The method is applied to a network device, and includes the following steps.

Step 201: When receiving an RRC reestablishment complete message sent by a terminal, determine a Packet Data Convergence Protocol (PDCP) type supported by a target network to be accessed by the terminal, where the PDCP type includes type-1 PDCP supporting a first network or type-2 PDCP supporting a second network.

The first network may be specifically an LTE network, and the second network may be an NR network. RRC connection reestablishment in this embodiment of this disclosure includes reestablishment from an eLTE network to an LTE or NR (eLTE) network.

In a specific embodiment of this disclosure, the terminal first determines a PDCP type for performing PDCP configuration for an SRB1 (signaling radio bearer (SRB)1) for sending the RRC reestablishment complete message; the terminal sends the RRC reestablishment complete message to the network device based on the PDCP type for performing the PDCP configuration; and when receiving the RRC reestablishment complete message sent by the terminal, the network device determines the PDCP type supported by the target network to be accessed by the terminal.

Step 202: Reconfigure bearers in a subsequent RRC process based on the determined PDCP type.

Herein, bearers in an RRC reestablishment process include at least one of the SRB1, an SRB2, and a DRB (data radio bearer).

According to the bearer configuration method for RRC connection reestablishment in this embodiment of this disclosure, when the RRC reestablishment complete message sent by the terminal is received, the PDCP type supported by the target network to be accessed by the terminal is determined; and the bearers in the subsequent RRC process are reconfigured based on the determined PDCP type. Therefore, when a terminal in an eLTE or NR cell performs RRC connection reestablishment, the terminal can determine PDCP used by bearers in an RRC reestablishment process, thereby ensuring success of RRC reestablishment.

Further, step 202 may include:

when detecting that the terminal configures the SRB1 by using the type-1 PDCP, and determining that the PDCP type supported by the target network to be accessed by the terminal is the type-2 PDCP, reconfiguring all bearers in an RRC reestablishment process by using the type-2 PDCP; or when detecting that the terminal configures the SRB1 by using the type-1 PDCP, and determining that the PDCP type supported by the target network to be accessed by the terminal is not the type-2 PDCP, reconfiguring all bearers in an RRC reestablishment process by using the type-1 PDCP.

Herein, if the UE first configures the SRB1 by using LTE PDCP, and the target network to be accessed supports NR PDCP, any bearer (including the SRB1, the SRB2, and the data radio bearer DRB) may be reconfigured subsequently by using NR PDCP (that is, configured by using the type-2 PDCP); or if the target network to be accessed does not support NR PDCP, the network may switch all the bearers to LTE PDCP (that is, the type-1 PDCP) in a full configuration (full configuration) mode.

In this embodiment of this disclosure, there are two types of communication pipes between an eNodeB and UE: SRB and DRB. The data radio bearer (Data Radio Bearer, DRB) is used for data transmission. Establishment of the DRB is completed by using a reconfiguration message (RRC Connection Reconfiguration).

The signaling radio bearer (Signaling Radio Bearer, SRB) is used for control signaling transmission, and is classified into three types: SRB0, SRB1, and SRB2. The SRB0 does not need to be established. The SRB0 is used to transmit signaling mapped to a common control channel CCCH, and has six RRC messages. An objective of performing RRC connection establishment is to establish the SRB1, and then transmit other RRC messages by using the SRB1.

The reconfiguring all bearers in an RRC reestablishment process by using the type-2 PDCP may include: reconfiguring all the bearers in the RRC reestablishment process by using the type-2 PDCP and reconfiguration signaling; or after a preset message is transmitted or a predetermined condition is satisfied in the RRC reestablishment process, reconfiguring all the bearers in the RRC reestablishment process by using the type-2 PDCP.

The preset message includes the RRC reestablishment complete message. For example, after the RRC reestablishment complete message is transmitted, the network and the UE implicitly switch to NR PDCP. The predetermined condition may be agreed upon or defined beforehand.

Based on this, after the reconfiguring all bearers in an RRC reestablishment process by using the type-1 PDCP, the method may further include: mapping a QoS flow to an evolved packet system (EPS) bearer; deleting an established SDAP entity; and converting a key of an NR core network to a key of an LTE core network through mapping, to obtain a key used by an LTE air interface. Therefore, the network device (such as a base station) can switch from an NR system to an LTE system.

Herein, the UE uses LTE PDCP for configuring the SRB1, and the UE completes calculation of a MAC-I by using an original key and an algorithm; mapping a QoS flow to an EPS bearer ID and deleting a SDAP entity are completed in the UE and the network device separately; and converting a key of one core network (NR 5GC) to a key of another core network (LTE EPC) through mapping to derive a key used by an air interface is completed in the UE and the network device separately, so that after LTE PDCP configuration is performed, signal processing can be performed based on the new configuration.

Further, step 202 includes:

when detecting that the terminal configures the SRB1 by using the type-2 PDCP, and determining that the PDCP type supported by the target network to be accessed by the terminal is the type-2 PDCP, reserving original configurations of bearers in an RRC reestablishment process, or reconfiguring all bearers in an RRC reestablishment process by using the type-1 PDCP; or when detecting that the terminal configures the SRB1 by using the type-2 PDCP, and determining that the PDCP type supported by the target network to be accessed by the terminal is not the type-2 PDCP but the RRC reestablishment complete message can be parsed, reconfiguring all bearers in an RRC reestablishment process by using the type-1 PDCP; or when detecting that the terminal configures the SRB1 by using the type-2 PDCP, and determining that the PDCP type supported by the target network to be accessed by the terminal is not the type-2 PDCP but the RRC reestablishment complete message cannot be parsed, rejecting the RRC reestablishment complete message.

Herein, the UE first uses NR PDCP for configuration during reestablishment. If the target access network supports NR PDCP, all previously reserved bearers may be supported, or may be reconfigured to use LTE PDCP. If the target access network does not support NR PDCP, but the network device recognizes the RRC reestablishment complete message, the network device may switch all bearers to LTE PDCP in a full configuration (full configuration) mode. If the target access network does not support NR PDCP, and the network device does not recognize the RRC reestablishment complete message, the network device may reject the message and cannot perform a subsequent procedure.

Based on this, the UE uses NR PDCP for configuration during reestablishment. The UE is allowed to initiate an RRC reestablishment request by using an NR RRC reestablishment request message; or the UE is allowed to initiate an RRC reestablishment request by using an LTE RRC reestablishment request message. In this case, a key (key), SDAP, and PDCP configurations may be reused, a default configuration of a corresponding standard is used for an RLC layer, and the RLC layer, an MAC layer, and PHY layers of the UE may be reconfigured by using air interface resource configuration signaling.

Further, when reestablishment occurs in an eLTE cell, the terminal needs to report CGI information in a failure report, where the CGI information includes a primary public land mobile network (PLMN) identity.

Based on this, the bearer configuration method for RRC connection reestablishment in this embodiment of this disclosure further includes:

receiving a radio link failure report sent by the terminal, where the radio link failure report carries cell global identity (CGI) information, and the CGI information includes a PLMN identity.

The CGI information includes:

a PLMN list of an LTE core network and a PLMN list of an NR core network; or a PLMN list of an NR core network; or a PLMN list of an LTE core network.

The primary PLMN is a first one in the PLMN list of the LTE core network; or the primary PLMN is a first one in the PLMN list of the NR core network; or when the PLMN list of the LTE core network and the PLMN list of the NR core network both exist, the primary PLMN is a first one in the PLMN list of the LTE core network; or when the PLMN list of the LTE core network and the PLMN list of the NR core network both exist, the primary PLMN is a first one in the PLMN list of the NR core network; or when the PLMN list of the LTE core network and the PLMN list of the NR core network both exist, and the PLMN list of the LTE core network is invalid, the primary PLMN is a first one in the PLMN list of the NR core network; or when the terminal is located at a non-access stratum of the LTE core network, the primary PLMN is a first one in the PLMN list of the LTE core network; or when the terminal is located at a non-access stratum of the NR core network, the primary PLMN is a first one in the PLMN list of the NR core network.

In a specific embodiment of this disclosure, before reestablishment occurs, the terminal may further select, based on a type of a cell in which the terminal is located, a corresponding primary PLMN for reporting, for example, report a first PLMN in a 5GC list in eLTE, and report a first PLMN in an EPC list in LTE.

According to the bearer configuration method for RRC connection reestablishment in this embodiment of this disclosure, when the RRC reestablishment complete message sent by the terminal is received, the PDCP type supported by the target network to be accessed by the terminal is determined; and the bearers in the RRC reestablishment process are reconfigured based on the determined PDCP type. Therefore, when a terminal in an eLTE or NR cell performs RRC connection reestablishment, the terminal can determine PDCP used by bearers in an RRC reestablishment process, thereby ensuring success of RRC reestablishment.

Figure 3:
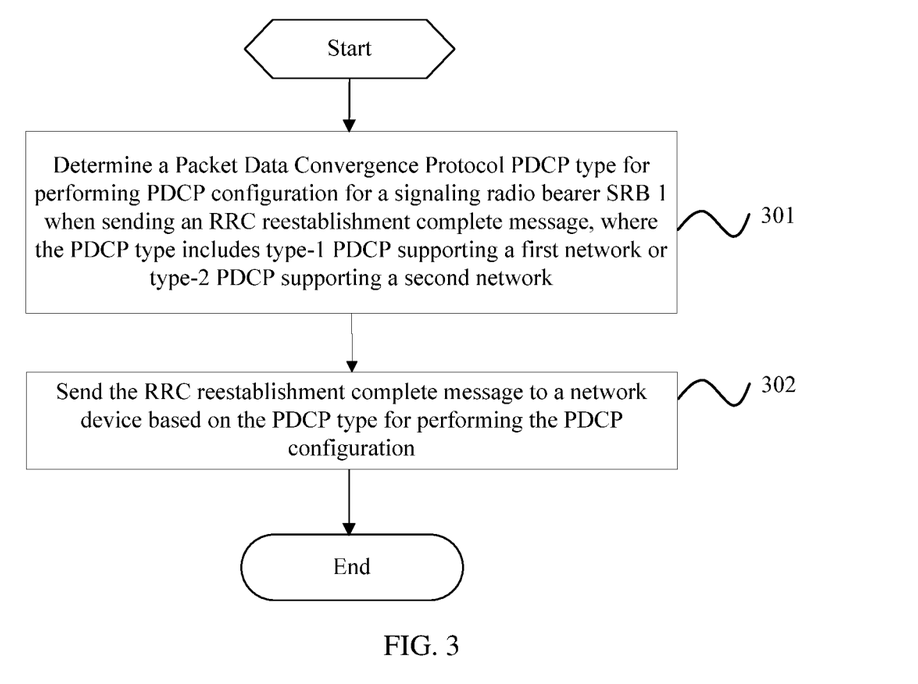
FIG. 3 is a second schematic flowchart of a bearer configuration method for RRC connection reestablishment according to an embodiment of this disclosure.

As shown in FIG. 3, an embodiment of this disclosure further provides a bearer configuration method for RRC connection reestablishment. The method is applied to a terminal, and includes the following steps.

Step 301: Determine a PDCP type for performing PDCP configuration for an SRB1 for sending an RRC reestablishment complete message, where the PDCP type includes type-1 PDCP supporting a first network or type-2 PDCP supporting a second network.

The first network may be specifically an LTE network, and the second network may be an NR (or eLTE) network. RRC connection reestablishment in this embodiment of this disclosure includes reestablishment from an eLTE network to an LTE or NR (or eLTE) network. The used PDCP type may be selected by the UE based on a standard, or may be configured by a network for the terminal beforehand.

Step 302: Send the RRC reestablishment complete message to a network device based on the PDCP type for performing the PDCP configuration.

In this embodiment of this disclosure, the terminal determines the PDCP type for performing the PDCP configuration for the SRB1 for sending the RRC reestablishment complete message; and the terminal sends the RRC reestablishment complete message to the network device based on the PDCP type for performing the PDCP configuration, so that the terminal can determine the PDCP type used by the SRB1 in an RRC reestablishment process.

Further, step 301 includes:
determining that the PDCP type for performing the PDCP configuration for the SRB1 for sending the RRC reestablishment complete message is the type-1 PDCP.

Further, step 301 of determining a PDCP type for performing PDCP configuration for an SRB1 for sending an RRC reestablishment complete message includes:
determining, in a predefined manner, or when detecting that a PDCP type supported by a target access network is not the type-2 PDCP, or when access times out, that the PDCP type for performing the PDCP configuration for the SRB1 for sending the RRC reestablishment complete message falls back to the type-1 PDCP.

The UE first uses NR PDCP for configuration during reestablishment. If the UE subsequently detects that the target access network does not support NR PDCP (for example, access timeout or failure), the UE automatically falls back (fallback) to use LTE PDCP for configuring the SRB1 to perform a reestablishment operation.

Based on this, after the sending the RRC reestablishment complete message to the network device, the method further includes:
mapping a QoS flow to an EPS bearer; deleting an established SDAP entity; and converting a key of an NR core network to a key of an LTE core network through mapping, to obtain a key used by an LTE air interface.

Herein, the UE uses LTE PDCP for configuring the SRB1, and the UE completes calculation of a MAC-I by using an original key and an algorithm; mapping a QoS flow to an EPS bearer ID and deleting a SDAP entity are completed in the UE and the network device; and converting a key of one core network (such as an NR 5GC) to a key of another core network (such as an LTE EPC) through mapping to derive a key used by an air interface is completed in the UE and the network device separately.

Further, step 301 of determining a PDCP type for performing PDCP configuration for an SRB1 for sending an RRC reestablishment complete message includes:
determining, in a predefined manner or when detecting that a PDCP type supported by a target network to be accessed is the type-2 PDCP, that the PDCP type for performing the PDCP configuration for the SRB1 for sending the RRC reestablishment complete message is the type-2 PDCP.

Herein, the UE needs to use NR PDCP for configuration during reestablishment, and a cell to be accessed definitely supports eLTE by default. To be specific, reestablishment across CNs (EPC and NGC) is not allowed. A network side learns context information of the UE beforehand. If reestablishment fails, cell selection is performed again.

Further, before the sending the RRC reestablishment complete message to the network device, the method may further include:
initiating an RRC reestablishment request by using an NR RRC reestablishment request message based on a network standard to be reestablished; or
initiating an RRC reestablishment request by using an LTE RRC reestablishment request message.

Further, after the initiating an RRC reestablishment request by using an NR RRC reestablishment request message based on a network standard to be reestablished, or initiating an RRC reestablishment request by using an LTE RRC reestablishment request message, the method may further include:
using a default configuration of a corresponding standard for an RLC layer, and reconfiguring the RLC layer, an MAC layer, and a PHY layer of the terminal by using air interface resource configuration signaling.

The UE uses NR PDCP for configuration during reestablishment. The UE is allowed to initiate the RRC reestablishment request by using the NR RRC reestablishment request message; or the UE is allowed to initiate the RRC reestablishment request by using the LTE RRC reestablishment request message. In this case, a key, SDAP, and PDCP configurations may be reused, the default configuration of the corresponding standard is used for an RLC layer, and the RLC layer, an MAC layer, and PHY layers of the UE may be reconfigured by using the air interface resource configuration signaling.

Further, before the initiating an RRC reestablishment request, the bearer configuration method further includes:

sending a radio link failure report to the network device, where the radio link failure report carries CGI information, and the CGI information includes a PLMN identity.

The CGI information includes:

a PLMN list of the LTE core network and a PLMN list of the NR core network; or a PLMN list of the NR core network; or a PLMN list of the LTE core network.

The primary PLMN is a first one in the PLMN list of the LTE core network; or the primary PLMN is a first one in the PLMN list of the NR core network; or when the PLMN list of the LTE core network and the PLMN list of the NR core network both exist, the primary PLMN is a first one in the PLMN list of the LTE core network; or when the PLMN list of the LTE core network and the PLMN list of the NR core network both exist, the primary PLMN is a first one in the PLMN list of the NR core network; or when the PLMN list of the LTE core network and the PLMN list of the NR core network both exist, and the PLMN list of the LTE core network is invalid, the primary PLMN is a first one in the PLMN list of the NR core network; or when the terminal is located at a non-access stratum of the LTE core network, the primary PLMN is a first one in the PLMN list of the LTE core network; or when the terminal is located at a non-access stratum of the NR core network, the primary PLMN is a first one in the PLMN list of the NR core network.

In the bearer configuration method for RRC connection reestablishment in this embodiment of this disclosure, the terminal determines the PDCP type for performing the PDCP configuration for the SRB1 for sending the RRC reestablishment complete message; and the terminal sends the RRC reestablishment complete message to the network device based on the PDCP type for performing the PDCP configuration, so that the terminal can determine the PDCP type used by the SRB1 in the RRC reestablishment process.

Figure 4:
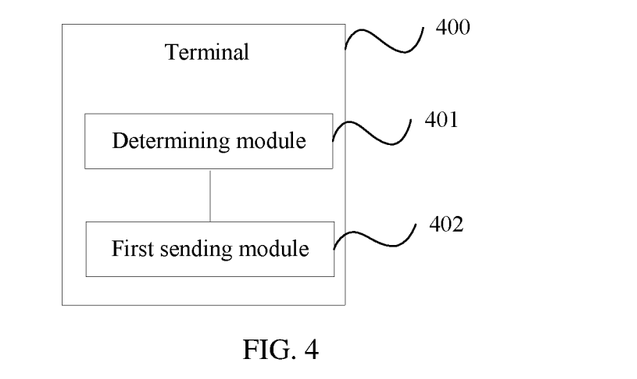
FIG. 4 is a schematic modular diagram of a terminal according to an embodiment of this disclosure.

FIG. 4 is a schematic modular diagram of a terminal according to an embodiment of this disclosure. As shown in FIG. 4, an embodiment of this disclosure further provides a terminal 400, including:

a determining module 401, configured to determine a PDCP type for performing PDCP configuration for an SRB1 when an RRC reestablishment complete message is sent, where the PDCP type includes type-1 PDCP supporting a first network or type-2 PDCP supporting a second network; and a first sending module 402, configured to send the RRC reestablishment complete message to a network device based on the PDCP type for performing the PDCP configuration.

In the terminal in this embodiment of this disclosure, the determining module is configured to determine that the PDCP type for performing the PDCP configuration for the SRB1 is the type-1 PDCP when the RRC reestablishment complete message is sent.

In the terminal in this embodiment of this disclosure, the determining module is configured to determine, in a predefined manner, or when detecting that a PDCP type supported by a target access network is not the type-2 PDCP, or when terminal access times out, that the PDCP type for performing the PDCP configuration for the SRB1 falls back to the type-1 PDCP when the RRC reestablishment complete message is sent.

The terminal in this embodiment of this disclosure further includes:

a second mapping module, configured to map a QoS flow to an EPS bearer;

a second deletion module, configured to delete an established Service Data Adaptation Protocol (SDAP) entity; and a second conversion module, configured to convert a key of an NR core network to a key of an LTE core network through mapping, to obtain a key used by an LTE air interface.

In the terminal in this embodiment of this disclosure, the determining module is configured to determine, in a predefined manner or when detecting that a PDCP type supported by a target network to be accessed is the type-2 PDCP, that the PDCP type for performing the PDCP configuration for the SRB1 is the type-2 PDCP when the RRC reestablishment complete message is sent.

In the terminal in this embodiment of this disclosure, the first sending module is further configured to: initiate an RRC reestablishment request by using an NR RRC reestablishment request message based on a network standard to be reestablished; or initiate an RRC reestablishment request by using an LTE RRC reestablishment request message.

The terminal in this embodiment of this disclosure further includes:

a configuration module, configured to control a radio link control (RLC) layer to use a default configuration of a corresponding standard, and reconfigure the RLC layer, a media access control (MAC) layer, and a physical (PHY) layer of the terminal by using air interface resource configuration signaling.

The terminal in this embodiment of this disclosure further includes:

a second sending module, configured to send a radio link failure report to the network device, where the radio link failure report carries CGI information, and the CGI information includes a PLMN identity.

The terminal in this embodiment of this disclosure sends the CGI information in the following manners, including:

sending a PLMN list of an LTE core network and a PLMN list of an NR core network; or sending a PLMN list of an NR core network; or sending a PLMN list of an LTE core network.

In the terminal in this embodiment of this disclosure, the primary PLMN is a first one in the PLMN list of the LTE core network; or the primary PLMN is a first one in the PLMN list of the NR core network; or when the PLMN list of the LTE core network and the PLMN list of the NR core network both exist, the primary PLMN is a first one in the PLMN list of the LTE core network; or when the PLMN list of the LTE core network and the PLMN list of the NR core network both exist, the primary PLMN is a first one in the PLMN list of the NR core network; or when the PLMN list of the LTE core network and the PLMN list of the NR core network both exist, and the PLMN list of the LTE core network is invalid, the primary PLMN is a first one in the PLMN list of the NR core network; or when the terminal is located at a non-access stratum of the LTE core network, the primary PLMN is a first one in the PLMN list of the LTE core network; or when the terminal is located at a non-access stratum of the NR core network, the primary PLMN is a first one in the PLMN list of the NR core network.

An embodiment of this disclosure further provides a terminal, including a memory, a processor, and a computer program stored in the memory and capable of running on the processor. When the computer program is executed by the processor, each process in the embodiment of the bearer configuration method for RRC connection reestablishment that is applied to a terminal is implemented, and a same technical effect can be achieved. To avoid repetition, details are not described again herein.

An embodiment of this disclosure further provides a computer-readable storage medium, where the computer-readable storage medium stores a computer program. When the computer program is executed by a processor, each process in the embodiment of the bearer configuration method for RRC connection reestablishment that is applied to a terminal is implemented, and a same technical effect can be achieved. To avoid repetition, details are not described again herein. The computer-readable storage medium is, for example, a read-only memory (Read-Only Memory, ROM), a random access memory (Random Access Memory, RAM), a magnetic disk, or an optical disc.

Figure 5:
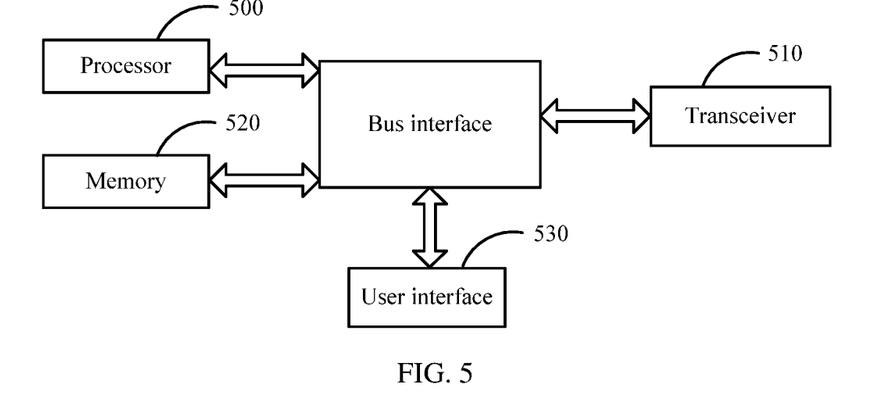
FIG. 5 is a first structural block diagram of a terminal according to an embodiment of this disclosure.

For better achieving the foregoing objective, as shown in FIG. 5, an embodiment of this disclosure further provides a terminal, including a memory 520, a processor 500, a transceiver 510, a user interface 530, a bus interface, and a computer program stored in the memory 520 and capable of running on the processor 500, where the processor 500 is configured to read the program in the memory 520 to perform the following process:

determining a PDCP type for performing PDCP configuration for an SRB1 for sending an RRC reestablishment complete message, where the PDCP type includes type-1 PDCP supporting a first network or type-2 PDCP supporting a second network; and sending the RRC reestablishment complete message to a network device based on the PDCP type for performing the PDCP configuration.

In FIG. 5, a bus architecture may include any quantity of interconnect buses and bridges, specifically for interconnecting various circuits of one or more processors represented by the processor 500 and a memory represented by the memory 520. The bus architecture may further interconnect various other circuits such as a peripheral device, a voltage regulator, and a power management circuit. These are all well known in the art, and therefore are not further described in this specification. The bus interface provides an interface. The transceiver 510 may be a plurality of components, that is, the transceiver 510 includes a transmitter and a receiver, and provides a unit for communicating with various other apparatuses on a transmission medium. For different user equipment, the user interface 530 may also be an interface for externally or internally connecting a required device, and the connected device includes but is not limited to a mini keyboard, a display, a speaker, a microphone, a joystick, or the like.

The processor 500 is responsible for bus architecture management and general processing. The memory 520 may store data used when the processor 500 performs an operation.

Optionally, by reading the program in the memory 520, the processor 500 is further configured to perform the following:

determining that the PDCP type for performing the PDCP configuration for the SRB1 for sending the RRC reestablishment complete message is the type-1 PDCP.

Optionally, by reading the program in the memory 520, the processor 500 is further configured to perform the following:

determining, in a predefined manner, or when detecting that a PDCP type supported by a target access network is not the type-2 PDCP, or when terminal access times out, that the PDCP type for performing the PDCP configuration for the SRB1 for sending the RRC reestablishment complete message falls back to the type-1 PDCP.

Optionally, by reading the program in the memory 520, the processor 500 is further configured to perform the following:

mapping a QoS flow to an EPS bearer;
deleting an established SDAP entity; and
converting a key of an NR core network to a key of an LTE core network through mapping, to obtain a key used by an LTE air interface.

Optionally, by reading the program in the memory 520, the processor 500 is further configured to perform the following:

determining, in a predefined manner or when detecting that a PDCP type supported by a target network to be accessed is the type-2 PDCP, that the PDCP type for performing the PDCP configuration for the SRB1 for sending the RRC reestablishment complete message is the type-2 PDCP.

Optionally, by reading the program in the memory 520, the processor 500 is further configured to perform the following:

initiating an RRC reestablishment request by using an NR RRC reestablishment request message based on a network standard to be reestablished; or initiating an RRC reestablishment request by using an LTE RRC reestablishment request message.

Optionally, by reading the program in the memory 520, the processor 500 is further configured to perform the following:

using a default configuration of a corresponding standard for an RLC layer, and reconfiguring the RLC layer, an MAC layer, and a PHY layer of the terminal by using air interface resource configuration signaling.

Optionally, by reading the program in the memory 520, the processor 500 is further configured to perform the following:

sending a radio link failure report to the network device, where the radio link failure report carries CGI information, and the CGI information includes a PLMN identity.

Optionally, a manner of sending the CGI information includes:

sending a PLMN list of an LTE core network and a PLMN list of an NR core network; or sending a PLMN list of an NR core network; or
sending a PLMN list of an LTE core network.

Optionally, the primary PLMN may be a first one in the PLMN list of the LTE core network; or the primary PLMN may be a first one in the PLMN list of the NR core network; or when the PLMN list of the LTE core network and the PLMN list of the NR core network both exist, the primary PLMN may be a first one in the PLMN list of the LTE core network; or when the PLMN list of the LTE core network and the PLMN list of the NR core network both exist, the primary PLMN may be a first one in the PLMN list of the NR core network; or when the PLMN list of the LTE core network and the PLMN list of the NR core network both exist, and the PLMN list of the LTE core network is invalid, the primary PLMN may be a first one in the PLMN list of the NR core network; or when the terminal is located at a non-access stratum of the LTE core network, the primary PLMN may be a first one in the PLMN list of the LTE core network; or when the terminal is located at a non-access stratum of the NR core network, the primary PLMN may be a first one in the PLMN list of the NR core network.

Figure 6:
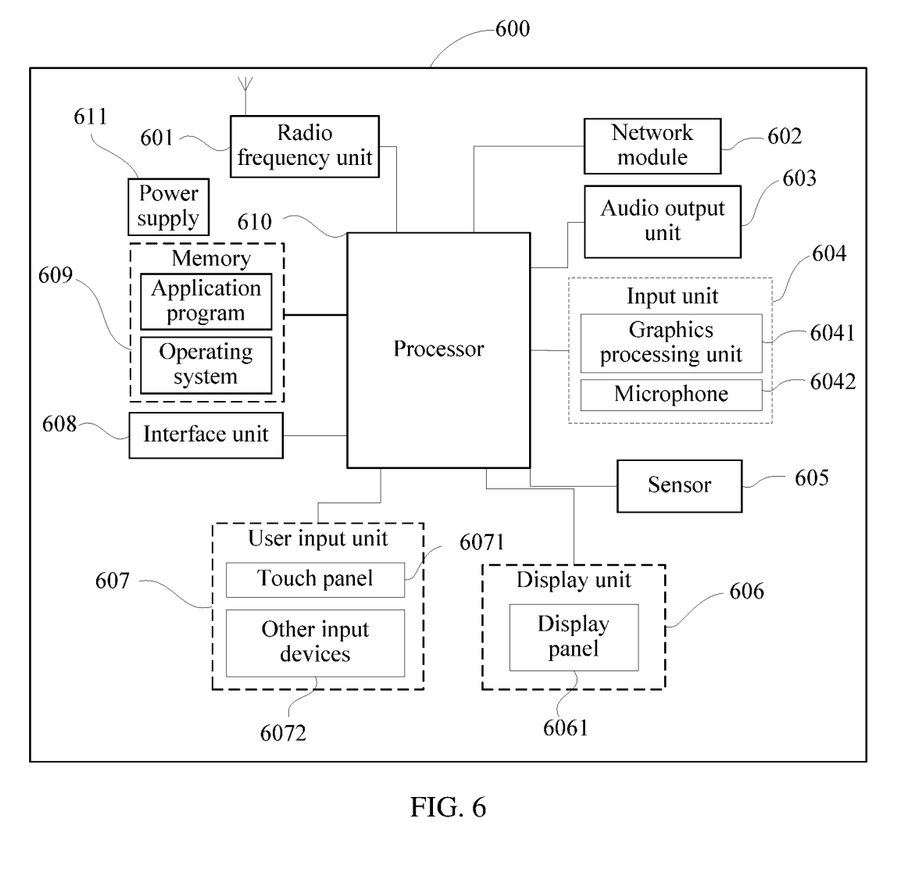
FIG. 6 is a second structural block diagram of a terminal according to an embodiment of this disclosure.

FIG. 6 is a schematic diagram of a hardware structure of a terminal for implementing each embodiment of this disclosure. The terminal 600 includes but is not limited to components such as a radio frequency unit 601, a network module 602, an audio output unit 603, an input unit 604, a sensor 605, a display unit 606, a user input unit 607, an interface unit 608, a memory 609, a processor 610, and a power supply 611. A person skilled in the art may understand that the structure of the terminal shown in FIG. 6 does not constitute a limitation on the terminal. A quantity of components included in the terminal may be greater or less than that shown in the figure, or some components are combined, or component arrangements are different. In this embodiment of this disclosure, the terminal includes but is not limited to a mobile phone, a tablet computer, a notebook computer, a palmtop computer, an in-vehicle terminal, a wearable device, a pedometer, or the like.

The processor 610 is configured to: determine a PDCP type for performing PDCP configuration for an SRB1 when an RRC reestablishment complete message is sent, where the PDCP type includes type-1 PDCP supporting a first network or type-2 PDCP supporting a second network; and send the RRC reestablishment complete message to a network device based on the PDCP type for performing the PDCP configuration.

In the technical solution of this embodiment of this disclosure, the terminal determines the PDCP type for performing the PDCP configuration for the SRB1 for sending the RRC reestablishment complete message; and the terminal sends the RRC reestablishment complete message to the network device based on the PDCP type for performing the PDCP configuration, so that the terminal can determine the PDCP type used by the SRB1 in an RRC reestablishment process.

It should be understood that in this embodiment of this disclosure, the radio frequency unit 601 may be configured to receive and send signals in an information reception or transmission or call process. Specifically, after receiving downlink data from the network device, the radio frequency unit 601 sends the downlink data to the processor 610 for processing, and in addition, sends uplink data to the network device. Generally, the radio frequency unit 601 includes but is not limited to an antenna, at least one amplifier, a transceiver, a coupler, a low noise amplifier, a duplexer, and the like. In addition, the radio frequency unit 601 may further communicate with a network and another device through a wireless communications system.

The terminal provides wireless broadband Internet access for a user by using the network module 602, for example, helps the user send and receive e-mails, browse web pages, and access streaming media.

The audio output unit 603 may convert audio data received by the radio frequency unit 601 or the network module 602 or stored in the memory 609 into an audio signal and output the audio signal as a sound. In addition, the audio output unit 603 may further provide an audio output (for example, a call signal reception sound or a message reception sound) related to a specific function performed by the terminal 600. The audio output unit 603 includes a speaker, a buzzer, a telephone receiver, and the like.

The input unit 604 is configured to receive an audio or video signal. The input unit 604 may include a graphics processing unit (Graphics Processing Unit, GPU) 6041 and a microphone 6042. The graphics processing unit 6041 processes image data of a still picture or a video obtained by an image capture apparatus (for example, a camera) in an image capture mode or a video capture mode. A processed image frame may be displayed on the display unit 606. An image frame processed by the graphics processing unit 6041 may be stored in the memory 609 (or another storage medium) or sent by the radio frequency unit 601 or the network module 602. The microphone 6042 can receive a sound and can process the sound into audio data. The processed audio data may be converted in a telephone call mode into a format that can be sent by the radio frequency unit 601 to a mobile communications network device, for outputting.

The terminal 600 further includes at least one sensor 605, for example, a light sensor, a motion sensor, and another sensor. Specifically, the light sensor includes an ambient light sensor and a proximity sensor. The ambient light sensor may adjust luminance of a display panel 6061 based on brightness of ambient light. The proximity sensor may turn off and/or backlight the display panel 6061 when the terminal 600 moves to an ear. As a type of motion sensor, an accelerometer sensor may detect acceleration magnitudes in all directions (generally three axes), and when the accelerometer sensor is stationary, may detect a magnitude and a direction of gravity, and may be configured to recognize a posture of the terminal (such as switching between landscape and portrait, related games, and magnetometer posture calibration), implement vibration recognition related functions (such as a pedometer and stroke), and the like. The sensor 605 may further include a fingerprint sensor, a pressure sensor, an iris sensor, a molecular sensor, a gyroscope, a barometer, a hygrometer, a thermometer, an infrared sensor, and the like. Details are not described herein.

The display unit 606 is configured to display information input by the user or information provided for the user. The display unit 606 may include the display panel 6061. The display panel 6061 may be configured in a form of a liquid crystal display (Liquid Crystal Display, LCD), an organic light-emitting diode (Organic Light-Emitting Diode, OLED), or the like.

The user input unit 607 may be configured to receive input digit or character information, and generate a key signal input related to a user setting and function control of the terminal. Specifically, the user input unit 607 includes a touch panel 6071 and other input devices 6072. The touch panel 6071, also referred to as a touchscreen, may capture a touch operation performed by the user on or near the touch panel (for example, an operation performed by the user on the touch panel 6071 or near the touch panel 6071 by using any appropriate object or accessory such as a finger or a stylus). The touch panel 6071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 610, and receives and executes a command sent by the processor 610. In addition, the touch panel 6071 may be implemented in a plurality of forms, for example, a resistive, capacitive, infrared, or surface acoustic wave touch panel. The user input unit 607 may further include the other input devices 6072 in addition to the touch panel 6071. Specifically, the other input devices 6072 may include but are not limited to a physical keyboard, a function key (such as a volume control key or a power on/off key), a trackball, a mouse, a joystick, and the like. Details are not described herein.

Further, the touch panel 6071 may cover the display panel 6061. After the touch panel 6071 detects a touch operation on or near the touch panel, the touch panel 6071 transmits the touch operation to the processor 610 to determine a type of a touch event. Then the processor 610 provides a corresponding visual output on the display panel 6061 based on the type of the touch event. Although the touch panel 6071 and the display panel 6061 are used as two independent components to implement input and output functions of the terminal in FIG. 6, the touch panel 6071 and the display panel 6061 may be integrated to implement the input and output functions of the terminal in some embodiments. This is not specifically limited herein.

The interface unit 608 is an interface for connecting an external apparatus to the terminal 600. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 608 may be configured to receive an input (for example, data information or power) from an external apparatus, and transmit the received input to one or more components in the terminal 600, or may be configured to transmit data between the terminal 600 and an external apparatus.

The memory 609 may be configured to store a software program and various data. The memory 609 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 609 may include a high-speed random access memory, or may include a non-volatile memory, for example, at least one magnetic disk storage device, a flash memory, or other non-volatile solid-state storage devices.

The processor 610 is a control center of the terminal. The processor 610 uses various interfaces and lines to connect all parts of the entire terminal, and performs various functions and data processing of the terminal by running or executing the software program and/or module stored in the memory 609 and invoking data stored in the memory 609, thereby performing overall monitoring on the terminal. The processor 610 may include one or more processing units. Optionally, the processor 610 may integrate an application processor and a modem processor. The application processor mainly processes the operating system, a user interface, an application program, and the like. The modem processor mainly processes wireless communication. It may be understood that the modem processor may alternatively not be integrated into the processor 610.

The terminal 600 may further include the power supply 611 (such as a battery) supplying power to each component. Optionally, the power supply 611 may be logically connected to the processor 610 by using a power management system, so that functions such as charge and discharge management and power consumption management are implemented by using the power management system.

In addition, the terminal 600 includes some functional modules that are not illustrated. Details are not described herein.

Figure 7:
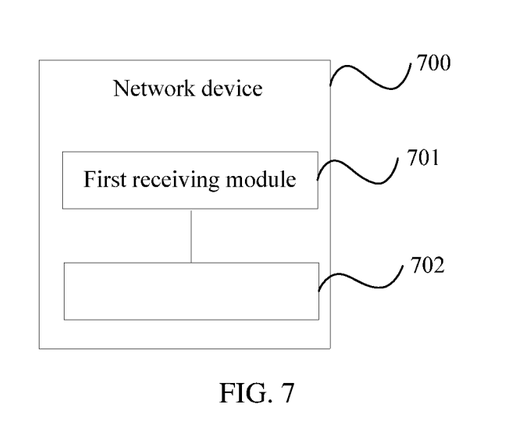
FIG. 7 is a schematic modular diagram of a network device according to an embodiment of this disclosure.

As shown in FIG. 7, an embodiment of this disclosure further provides a network device 700, including:

a first receiving module 701, configured to: when receiving an RRC reestablishment complete message sent by a terminal, determine a PDCP type supported by a target network to be accessed by the terminal, where the PDCP type includes type-1 PDCP supporting a first network or type-2 PDCP supporting a second network; and a reconfiguration module 702, configured to reconfigure bearers in a subsequent RRC process based on the determined PDCP type.

In the network device in this embodiment of this disclosure, the reconfiguration module is configured to: when it is detected that the terminal configures an SRB1 by using the type-1 PDCP, and it is determined that the PDCP type supported by the target network to be accessed by the terminal is the type-2 PDCP, reconfigure all bearers in an RRC reestablishment process by using the type-2 PDCP; or when it is detected that the terminal configures an SRB1 by using the type-1 PDCP, and it is determined that the PDCP type supported by the target network to be accessed by the terminal is not the type-2 PDCP, reconfigure all bearers in an RRC reestablishment process by using the type-1 PDCP.

In the network device in this embodiment of this disclosure, the reconfiguration module is configured to: reconfigure all the bearers in the RRC reestablishment process by using the type-2 PDCP and reconfiguration signaling; or after a preset message is transmitted or a predetermined condition is satisfied in the RRC reestablishment process, reconfigure all the bearers in the RRC reestablishment process by using the type-2 PDCP.

The network device in this embodiment of this disclosure further includes:

a first mapping module, configured to map a QoS flow to an EPS bearer;

a first deletion module, configured to delete an established SDAP entity; and a first conversion module, configured to convert a key of an NR core network to a key of an LTE core network through mapping, to obtain a key used by an LTE air interface.

In the network device in this embodiment of this disclosure, the reconfiguration module is configured to: when it is detected that the terminal configures an SRB1 by using the type-2 PDCP, and it is determined that the PDCP type supported by the target network to be accessed by the terminal is the type-2 PDCP, reserve original configurations of bearers in an RRC reestablishment process, or reconfigure all bearers in an RRC reestablishment process by using the type-1 PDCP; or when it is detected that the terminal configures an SRB1 by using the type-2 PDCP, and it is determined that the PDCP type supported by the target network to be accessed by the terminal is not the type-2 PDCP but the RRC reestablishment complete message can be parsed, reconfigure all bearers in an RRC reestablishment process by using the type-1 PDCP; or when it is detected that the terminal configures an SRB1 by using the type-2 PDCP, and it is determined that the PDCP type supported by the target network to be accessed by the terminal is not the type-2 PDCP but the RRC reestablishment complete message cannot be parsed, reject the RRC reestablishment complete message.

The network device in this embodiment of this disclosure further includes:

a second receiving module, configured to receive a radio link failure report sent by the terminal, where the radio link failure report carries CGI information, and the CGI information includes a PLMN identity.

An embodiment of this disclosure further provides a network device, including a memory, a processor, and a computer program stored in the memory and capable of running on the processor. When the computer program is executed by the processor, each process in the method embodiment of the bearer configuration method for RRC connection reestablishment that is applied to a network device is implemented, and a same technical effect can be achieved. To avoid repetition, details are not described again herein.

An embodiment of this disclosure further provides a computer-readable storage medium, where the computer-readable storage medium stores a computer program. When the computer program is executed by a processor, each process in the embodiment of the bearer configuration method for RRC connection reestablishment that is applied to a network device is implemented, and a same technical effect can be achieved. To avoid repetition, details are not described again herein. The computer-readable storage medium is, for example, a read-only memory (Read-Only Memory, ROM), a random access memory (Random Access Memory, RAM), a magnetic disk, or an optical disc.

Figure 8:
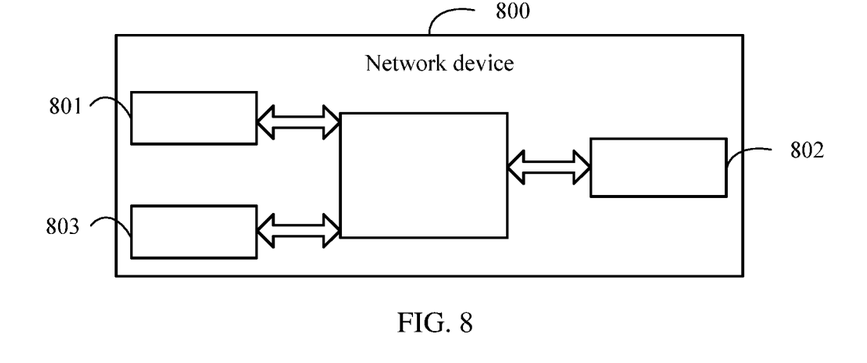
FIG. 8 is a structural block diagram of a network device according to an embodiment of this disclosure.

As shown in FIG. 8, an embodiment of this disclosure further provides a network device 800, including a processor 801, a transceiver 802, a memory 803, and a bus interface, where the processor 801 is configured to read a program in the memory 803 to perform the following process:

when receiving an RRC reestablishment complete message sent by a terminal, determining a PDCP type supported by a target network to be accessed by the terminal, where the PDCP type includes type-1 PDCP supporting a first network or type-2 PDCP supporting a second network; and reconfiguring bearers in a subsequent RRC process based on the determined PDCP type.

In FIG. 8, a bus architecture may include any quantity of interconnect buses and bridges, specifically for interconnecting various circuits of one or more processors represented by the processor 801 and a memory represented by the memory 803. The bus architecture may further interconnect various other circuits such as a peripheral device, a voltage regulator, and a power management circuit. These are all well known in the art, and therefore are not further described in this specification. The bus interface provides an interface. The transceiver 802 may be a plurality of components, that is, the transceiver 802 includes a transmitter and a receiver, and provides a unit for communicating with various other apparatuses on a transmission medium.

The processor 801 is responsible for bus architecture management and general processing. The memory 803 may store data used when the processor 801 performs an operation.

Optionally, by reading the program in the memory 803, the processor 801 is further configured to perform the following:

when detecting that the terminal configures an SRB1 by using the type-1 PDCP, and determining that the PDCP type supported by the target network to be accessed by the terminal is the type-2 PDCP, reconfiguring all bearers in an RRC reestablishment process by using the type-2 PDCP; or when detecting that the terminal configures an SRB1 by using the type-1 PDCP, and determining that the PDCP type supported by the target network to be accessed by the terminal is not the type-2 PDCP, reconfiguring all bearers in an RRC reestablishment process by using the type-1 PDCP.

Optionally, by reading the program in the memory 803, the processor 801 is further configured to perform the following:

reconfiguring all the bearers in the RRC reestablishment process by using the type-2 PDCP and reconfiguration signaling; or after a preset message is transmitted or a predetermined condition is satisfied in the RRC reestablishment process, reconfiguring all the bearers in the RRC reestablishment process by using the type-2 PDCP.

Optionally, by reading the program in the memory 803, the processor 801 is further configured to perform the following:

mapping a QoS flow to an EPS bearer;

deleting an established SDAP entity; and converting a key of an NR core network to a key of an LTE core network through mapping, to obtain a key used by an LTE air interface.

Optionally, by reading the program in the memory 803, the processor 801 is further configured to perform the following:

when detecting that the terminal configures an SRB1 by using the type-2 PDCP, and determining that the PDCP type supported by the target network to be accessed by the terminal is the type-2 PDCP, reserving original configurations of bearers in an RRC reestablishment process, or reconfiguring all bearers in an RRC reestablishment process by using the type-1 PDCP; or when detecting that the terminal configures an SRB1 by using the type-2 PDCP, and determining that the PDCP type supported by the target network to be accessed by the terminal is not the type-2 PDCP but the RRC reestablishment complete message can be parsed, reconfiguring all bearers in an RRC reestablishment process by using the type-1 PDCP; or when detecting that the terminal configures an SRB1 by using the type-2 PDCP, and determining that the PDCP type supported by the target network to be accessed by the terminal is not the type-2 PDCP but the RRC reestablishment complete message cannot be parsed, rejecting the RRC reestablishment complete message.

Optionally, by reading the program in the memory 803, the processor 801 is further configured to perform the following:

receiving a radio link failure report sent by the terminal, where the radio link failure report carries CGI information, and the CGI information includes a PLMN identity.

It should be noted that the terms "include", "comprise", or any of their variants are intended to cover a non-exclusive inclusion, such that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing implementations, a person skilled in the art can clearly understand that the method in the foregoing embodiments may be implemented by software in addition to a necessary universal hardware platform or by hardware only. In most cases, the former is a more preferred implementation. Based on such an understanding, the technical solutions of this disclosure essentially, or the part contributing to the related art may be implemented in a form of a computer software product. The computer software product is stored in a storage medium (for example, a ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The embodiments of this disclosure are described above with reference to the accompanying drawings, but this disclosure is not limited to the embodiments. The embodiments are only illustrative rather than restrictive. Inspired by this disclosure, a person of ordinary skill in the art can still derive a plurality of variations without departing from the essence of this disclosure and the protection scope of the claims. All these variations shall fall within the protection of this disclosure.

The invention claimed is:

1. A bearer configuration method for radio resource control (RRC) connection reestablishment, performed by a terminal, and the bearer configuration method comprising:
   determining a Packet Data Convergence Protocol (PDCP) type for an SRB1 (signaling radio bearer (SRB)1) prior to sending an RRC reestablishment complete message, wherein the PDCP type comprises type-1 PDCP supporting a first network or type-2 PDCP supporting a second network, wherein the first network is an LTE network, and the second network is an NR network or an eLTE network, wherein the type-1 PDCP is LTE PDCP, and the type-2 PDCP is NR PDCP; and
   sending the RRC reestablishment complete message to a network device based on the PDCP type,
   wherein the determining the PDCP type for the SRB1 comprises:
   determining, in a predefined manner, or when detecting that a PDCP type supported by a target network to be accessed is not the NR PDCP, or when terminal access times out, that the PDCP type for the SRB1 falls back to the LTE PDCP; or
   determining, in a predefined manner, or when detecting that a PDCP type supported by a target network to be accessed is the NR PDCP, that the PDCP type for the SRB1 is the NR PDCP.

2. The bearer configuration method for RRC connection reestablishment according to claim 1, wherein after the sending the RRC reestablishment complete message to the network device, the method further comprises:
   mapping a QoS flow to an evolved packet system (EPS) bearer;
   deleting an established Service Data Adaptation Protocol (SDAP) entity; and
   converting a key of an NR core network to a key of an LTE core network through mapping, to obtain a key used by an LTE air interface.

3. The bearer configuration method for RRC connection reestablishment according to claim 1, wherein before the sending the RRC reestablishment complete message to the network device, the method further comprises:
   initiating an RRC reestablishment request by using an NR RRC reestablishment request message based on a network standard to be reestablished; or
   initiating an RRC reestablishment request by using an LTE RRC reestablishment request message.

4. The bearer configuration method for RRC connection reestablishment according to claim 3, further comprising:
   using a default configuration of a corresponding standard for a radio link control (RLC) layer, and reconfiguring the RLC layer, a media access control (MAC) layer, and a physical (PHY) layer of the terminal by using air interface resource configuration signaling.

5. The bearer configuration method for RRC connection reestablishment according to claim 4, wherein before the initiating an RRC reestablishment request, the method further comprises:
   sending a radio link failure report to the network device, wherein the radio link failure report carries cell global identity (CGI) information, and the CGI information comprises a primary public land mobile network (PLMN) identity.

6. The bearer configuration method for RRC connection reestablishment according to claim 5, wherein the CGI information comprises:
   a PLMN list of an LTE core network and a PLMN list of an NR core network; or
   a PLMN list of an NR core network; or
   a PLMN list of an LTE core network.

7. The bearer configuration method for RRC connection reestablishment according to claim 6, wherein the primary PLMN is a first one in the PLMN list of the LTE core network; or
   the primary PLMN is a first one in the PLMN list of the NR core network; or
   when the PLMN list of the LTE core network and the PLMN list of the NR core network both exist, the primary PLMN is a first one in the PLMN list of the LTE core network; or
   when the PLMN list of the LTE core network and the PLMN list of the NR core network both exist, the primary PLMN is a first one in the PLMN list of the NR core network; or
   when the PLMN list of the LTE core network and the PLMN list of the NR core network both exist, and the PLMN list of the LTE core network is invalid, the primary PLMN is a first one in the PLMN list of the NR core network; or
   when the terminal is located at a non-access stratum of the LTE core network, the primary PLMN is a first one in the PLMN list of the LTE core network; or
   when the terminal is located at a non-access stratum of the NR core network, the primary PLMN is a first one in the PLMN list of the NR core network.

8. A terminal, comprising a memory, a processor, and a computer program stored in the memory and capable of running on the processor, wherein when the computer program is executed by the processor, steps of a bearer configuration method for radio resource control (RRC) connection reestablishment, applied to the terminal, are implemented, and the bearer configuration method comprising:
  determining a Packet Data Convergence Protocol (PDCP) type for an SRB1 (signaling radio bearer (SRB)1) prior to sending an RRC reestablishment complete message, wherein the PDCP type comprises type-1 PDCP supporting a first network or type-2 PDCP supporting a second network, wherein the first network is an LTE network, and the second network is an NR network or an eLTE network, wherein the type-1 PDCP is LTE PDCP, and the type-2 PDCP is NR PDCP; and
  sending the RRC reestablishment complete message to a network device based on the PDCP type,
  wherein the determining the PDCP type for the SRB1 comprises:
  determining, in a predefined manner, or when detecting that a PDCP type supported by a target network to be accessed is not the NR PDCP, or when terminal access times out, that the PDCP type for the SRB1 falls back to the LTE PDCP; or
  determining, in a predefined manner, or when detecting that a PDCP type supported by a target network to be accessed is the NR PDCP, that the PDCP type for the SRB1 is the NR PDCP for performing the PDCP configuration.

9. The terminal according to claim 8, wherein before the sending the RRC reestablishment complete message to the network device, the bearer configuration method further comprises:
  initiating an RRC reestablishment request by using an NR RRC reestablishment request message based on a network standard to be reestablished; or initiating an RRC reestablishment request by using an LTE RRC reestablishment request message,
  wherein before the initiating the RRC reestablishment request, the method further comprises:
  sending a radio link failure report to the network device, wherein the radio link failure report carries cell global identity (CGI) information, and the CGI information comprises a primary public land mobile network (PLMN) identity.

10. The terminal according to claim 9, wherein the CGI information comprises:
  a PLMN list of an LTE core network and a PLMN list of an NR core network; or
  a PLMN list of an NR core network; or
  a PLMN list of an LTE core network.

11. The terminal according to claim 10, wherein the primary PLMN is a first one in the PLMN list of the LTE core network; or
  the primary PLMN is a first one in the PLMN list of the NR core network; or
  when the PLMN list of the LTE core network and the PLMN list of the NR core network both exist, the primary PLMN is a first one in the PLMN list of the LTE core network; or
  when the PLMN list of the LTE core network and the PLMN list of the NR core network both exist, the primary PLMN is a first one in the PLMN list of the NR core network; or
  when the PLMN list of the LTE core network and the PLMN list of the NR core network both exist, and the PLMN list of the LTE core network is invalid, the primary PLMN is a first one in the PLMN list of the NR core network; or
  when the terminal is located at a non-access stratum of the LTE core network, the primary PLMN is a first one in the PLMN list of the LTE core network; or
  when the terminal is located at a non-access stratum of the NR core network, the primary PLMN is a first one in the PLMN list of the NR core network.

12. The terminal according to claim 9, wherein the bearer configuration method further comprises:
  using a default configuration of a corresponding standard for a radio link control (RLC) layer, and reconfiguring the RLC layer, a media access control (MAC) layer, and a physical (PHY) layer of the terminal by using air interface resource configuration signaling.

13. The terminal according to claim 12, wherein before the initiating an RRC reestablishment request, the bearer configuration method further comprises:
  sending a radio link failure report to the network device, wherein the radio link failure report carries cell global identity (CGI) information, and the CGI information comprises a primary public land mobile network (PLMN) identity.

14. The terminal according to claim 10, wherein the primary PLMN is a first one in the PLMN list of the LTE core network; or
  the primary PLMN is a first one in the PLMN list of the NR core network; or
  when the PLMN list of the LTE core network and the PLMN list of the NR core network both exist, the primary PLMN is a first one in the PLMN list of the LTE core network; or
  when the PLMN list of the LTE core network and the PLMN list of the NR core network both exist, the primary PLMN is a first one in the PLMN list of the NR core network; or
  when the PLMN list of the LTE core network and the PLMN list of the NR core network both exist, and the PLMN list of the LTE core network is invalid, the primary PLMN is a first one in the PLMN list of the NR core network; or
  when the terminal is located at a non-access stratum of the LTE core network, the primary PLMN is a first one in the PLMN list of the LTE core network; or
  when the terminal is located at a non-access stratum of the NR core network, the primary PLMN is a first one in the PLMN list of the NR core network.

15. The terminal according to claim 8, wherein after the sending the RRC reestablishment complete message to the network device, the bearer configuration method further comprises:
  mapping a QoS flow to an evolved packet system (EPS) bearer;
  deleting an established Service Data Adaptation Protocol (SDAP) entity; and
  converting a key of an NR core network to a key of an LTE core network through mapping, to obtain a key used by an LTE air interface.

16. A network device, comprising a memory, a processor, and a computer program stored in the memory and capable of running on the processor, wherein when the computer program is executed by the processor, steps of a bearer configuration method for radio resource control (RRC) connection reestablishment, applied to the network device, are implemented, and the bearer configuration method comprising:
  when receiving an RRC reestablishment complete message sent by a terminal, determining a Packet Data Convergence Protocol (PDCP) type supported by a target network to be accessed by the terminal, wherein the PDCP type comprises type-1 PDCP supporting a first network or type-2 PDCP supporting a second network, wherein the first network is an LTE network, and the second network is an NR network or an eLTE network, wherein the type-1 PDCP is LTE PDCP, and the type-2 PDCP is NR PDCP; and reconfiguring bearers in a subsequent RRC process based on the determined PDCP type, wherein the determining the PDCP type supported by the target network to be accessed by the terminal is conducted on the basis of the PDCP type for an SRB1 (signaling radio bearer (SRB)1) and comprises:

determining, in a predefined manner, or when detecting that a PDCP type supported by a target network to be accessed is not the NR PDCP, or when terminal access times out, that the PDCP type for the SRB1 falls back to the LTE PDCP; or determining, in a predefined manner, or when detecting that a PDCP type supported by a target network to be accessed is the NR PDCP, that the PDCP type for the SRB1 is the NR PDCP.

17. The network device according to claim 16, wherein the step of reconfiguring bearers in a subsequent RRC process based on the determined PDCP type comprises:

when detecting that the terminal configures an SRB1 (signaling radio bearer (SRB)1) by using the type-1 PDCP, and determining that the PDCP type supported by the target network to be accessed by the terminal is the type-2 PDCP, reconfiguring all bearers in an RRC reestablishment process by using the type-2 PDCP; or when detecting that the terminal configures an SRB1 by using the type-1 PDCP, and determining that the PDCP type supported by the target network to be accessed by the terminal is not the type-2 PDCP, reconfiguring all bearers in an RRC reestablishment process by using the type-1 PDCP.

18. The network device according to claim 17, wherein after the reconfiguring all bearers in an RRC reestablishment process by using the type-1 PDCP, the bearer configuration method further comprises:

mapping a QoS flow to an evolved packet system (EPS) bearer;

deleting an established Service Data Adaptation Protocol (SDAP) entity; and converting a key of an NR core network to a key of an LTE core network through mapping, to obtain a key used by an LTE air interface.

19. The network device according to claim 16, wherein the bearer configuration method further comprises:

receiving a radio link failure report sent by the terminal, wherein the radio link failure report carries cell global identity (CGI) information, and the CGI information comprises a primary public land mobile network (PLMN) identity.

* * * * *